United States Patent
Strasser

(10) Patent No.: US 6,536,792 B2
(45) Date of Patent: Mar. 25, 2003

(54) DRIVE-AWAY BLOCKING DEVICE FOR MOTORCYCLES HAVING A SIDE SUPPORT

(75) Inventor: Ralf Strasser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 6 days.

(21) Appl. No.: 09/903,587

(22) Filed: Jul. 13, 2001

(65) Prior Publication Data
US 2002/0017417 A1 Feb. 14, 2002

(30) Foreign Application Priority Data
Aug. 10, 2000 (DE) ......... 100 39 021

(51) Int. Cl.$^7$ ............ B62H 1/00
(52) U.S. Cl. ............ 280/293
(58) Field of Search ............ 280/293–304; 180/219, 272

(56) References Cited

U.S. PATENT DOCUMENTS

| | | | |
|---|---|---|---|
| 2,300,762 A | * 11/1942 | Andrews | 180/219 |
| 3,678,455 A | * 7/1972 | Levey | 340/427 |
| 3,788,671 A | * 1/1974 | MacAlpine | 280/303 |
| 3,908,780 A | 9/1975 | McClure et al. | |
| 4,016,538 A | * 4/1977 | Miller | 340/457 |
| 4,084,656 A | * 4/1978 | Itoh et al. | 180/219 |
| 4,223,906 A | * 9/1980 | Gratza | 280/301 |
| 4,638,880 A | 1/1987 | Togashi | |
| 4,671,374 A | * 6/1987 | Kouyama et al. | 180/219 |
| 4,693,488 A | * 9/1987 | Bernocco | 280/293 |
| 4,883,284 A | * 11/1989 | Nakazawa et al. | 280/293 |
| 4,938,308 A | * 7/1990 | Takayama | 180/165 |
| 5,819,868 A | * 10/1998 | Koike et al. | 180/220 |
| 6,170,846 B1 | * 1/2001 | Holter | 280/293 |

FOREIGN PATENT DOCUMENTS

| | | | | |
|---|---|---|---|---|
| DE | G 73 28 256.1 | 12/1973 | | |
| DE | 38 40 252 | 8/1989 | | |
| DE | G 90 02 125.8 | 6/1990 | | |
| DE | 42 35 672 | 4/1993 | | |
| EP | 0 820 919 | 1/1998 | | |
| JP | 02081774 A | * 3/1990 | | B62H/1/02 |
| JP | 02109786 A | * 4/1990 | | B62H/1/02 |
| JP | 02249776 A | * 10/1990 | | B62H/1/02 |
| JP | 04339082 A | * 11/1992 | | B62H/1/02 |

* cited by examiner

Primary Examiner—Lesley D. Morris
Assistant Examiner—Paul Royal, Jr.
(74) Attorney, Agent, or Firm—Crowell & Moring LLP

(57) ABSTRACT

A drive-away blocking device is provided for motorcycles having a side support. A sensor, which is mounted on the vehicle and has a linearly guided distance sensing device, and a control component, which is rigidly connected with the swivellable side support and which, at a site eccentric with respect to the axis of rotation of the side support, is connected by way of a restricted guidance with the distance sensing device of the sensor, are provided. In the operational support position of the side support, the sensor emits a signal to the electric or electronic engine control unit to prevent a driving-away of the motorcycle.

8 Claims, 1 Drawing Sheet

DRIVE-AWAY BLOCKING DEVICE FOR MOTORCYCLES HAVING A SIDE SUPPORT

BACKGROUND AND SUMMARY OF THE INVENTION

This application claims the priority of German Application No. 100 39 021.8, filed Aug. 10, 2000, the disclosure of which is expressly incorporated by reference herein.

The invention relates to a drive-away blocking device for motorcycles having a side support ("kick stand"), including a sensor, which is mounted on the vehicle and has a linearly guided distance sensing device, and a control component, which is rigidly connected with the swivellable side support. At a site eccentric with respect to the axis of rotation of the side support, the control component is connected with the distance sensing device of the sensor. In the activated swivelling position of the side support, the sensor emits a signal to the electric or electronic engine management which prevents a driving-away of the motorcycle.

Drive-away blocking devices of this type are known, in which the sensor is constructed as a linear switch which is placed in the electric circuit for engine management. When the side support is swivelled upward into the inoperative position by the driver of the motorcycle, the distance sensing device—in this case an actuating pin—is linearly shifted against the prestressing force of an assigned pressure spring relative to the housing of the switch in order to actuate the switch and close the electric circuit. When the side support is swivelled downward into the operative position, the actuating pin can be shifted under the prestressing force of the spring so that the switch is actuated and the electric circuit is opened. The electric circuit can be constructed such that either the engine cannot be started at all, or that, although the engine can be started, the ignition current circuit is interrupted when it is attempted to engage a gear and to close the clutch. This known drive-away blocking device has the disadvantage that the distance sensing device, that is, the actuating pin, may jam as a result of dirt accumulation. When the side support is swivelled up into the inoperative position, the actuating pin is restrictedly guided into its closed position. When, at a later point in time, the side support is swivelled downward, the actuating pin remains in the closed position because of the increased friction due to the dirt accumulation for example, in which a starting and driving-way of the motorcycle is possible. The drive-away blocking device is therefore ineffective.

For increasing the operational reliability, it is also known to connect, in the case of a drive-away blocking device of the above-described construction, the actuating pin by way of a tension spring with the control component fastened on the side support. This spring permits, on the one hand, the compensation of tolerances, so that the path of the control component can be larger than the path of the actuating pin. On the other hand, when the side support is swivelled into the operative position, a force is exercised by the tension spring upon the actuating pin in order to move this actuating pin into the position for opening the electric circuit. However, even this improved drive-away blocking device is still unsatisfactory with respect to a protection against faulty operations. When the friction of the actuating pin in the switch housing, as a result of dirt accumulations or corrosion, exceeds the force of the spring, instead of the linear movement of the actuating pin, only a rotation of the tension spring will occur. The drive-away blocking device will therefore be ineffective.

It is an object of the invention to improve the drive-away blocking device of the above-mentioned type with respect to its operational reliability.

According to the invention, this object is achieved by a drive-away blocking device wherein the control component is connected with the distance sensing device of the sensor by way of a restricted guidance. As a result of this restricted guidance, it is ensured that the distance sensing device is reliably moved from one end position to the other when the side support is swivelled downward into the operative position. As a result, it can be reliably prevented that the driver starts to move the motor vehicle as long as the side support is not in the upward-swivelled inoperative position.

The basic idea of the invention can be implemented in that the sensor is swivellably connected with the vehicle and in that the distance sensing device of the sensor is connected with the control component of the side support in an articulated manner.

However, a different kinematic embodiment is also possible which consists of rigidly fastening the sensor to the vehicle and of coupling the distance sensing device of the sensor with a control cam of the control component. In this case, the distance sensing device preferably has a pin at the free end, the pin is guided in a control slot of the control component.

In all above-mentioned embodiments of the invention, the sensor can be constructed as a linear switch which is placed in the electric circuit for engine management. Such a linear switch is a standard component which is commercially available at reasonable cost.

Other objects, advantages and novel features of the present invention will become apparent from the following detailed description of the invention when considered in conjunction with the accompanying drawings.

DETAILED DESCRIPTION OF THE DRAWINGS

Figure 1:
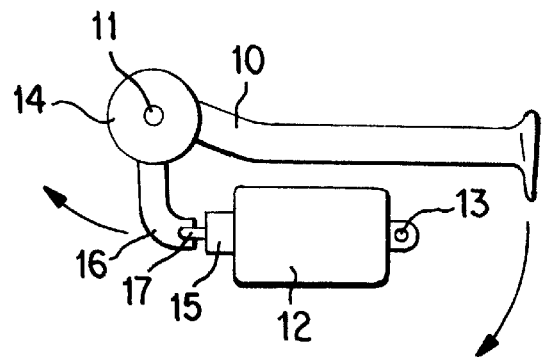
FIG. 1 is a schematic representation of a first embodiment of a drive-away blocking device for motorcycles, a side support being swivelled upward into an inoperative position.

A side support 10 (a so-called "kick stand") of a motorcycle schematically illustrated in FIG. 1 is swivellable about an approximately horizontal axis 11 connected with the motorcycle frame (not shown). A sensor 12 (constructed as a linear switch) is swivellable about an axis of rotation 13 parallel to, and at a distance from the rotation axis 11 connected with the frame of the motorcycle. A distance sensing device 15 is linearly movably disposed in the sensor 12. Since, in the present case, the sensor 12 is constructed as a linear switch, the distance sensing device 15 will in the following be called an actuating pin. Because such a linear switch is generally known, a further explanation of the constructive details is not required. The actuating pin 15 rests slidingly against a strip conductor, and an electric signal is generated when the distance sensing device 15 is in its right end position illustrated in FIG. 1. An extension-arm-type control component 16 is rigidly connected, or constructed in one piece, with a hub 14 of the side support 10. The free ends of the control component 16 and of the actuating pin 15, respectively, are connected via a hinge 17 with an axis which is parallel to the axes of rotation 11 and 13. It is demonstrated that this arrangement forms a four-bar linkage with three rotating pairs and one sliding pair which is also called a slider crank.

Figure 2:
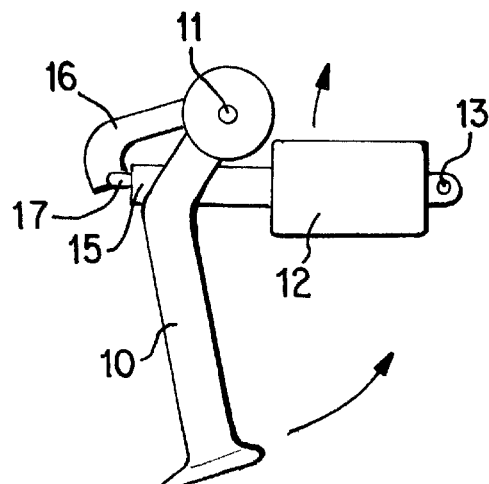
FIG. 2 is a representation similar to FIG. 2 with the side support swivelled downward into the operative position.

When the side support 10 is swivelled from the inoperative position illustrated in FIG. 1 downward into the operative position illustrated in FIG. 2, the actuating pin 15 is restrictedly pulled out of the linear switch 12, and the electric contact is interrupted. The linear switch may be placed in the ignition current circuit of the motorcycle. When the side support 10 is swivelled downward into the operative position, the ignition current circuit is necessarily interrupted so that the engine cannot be started. However, it is also possible to arrange an additional electric switch, which can be operated by means of the clutch grip, parallel to the linear switch 12. Although in this case the engine can be started while the side support 10 is in the operative position, the ignition current circuit will automatically be interrupted as soon as the driver attempts to operate the clutch.

The linear switch 12, which is restrictedly coupled with the side support 10, forms a drive-away blocking device which reliably prevents the starting of the engine or the operating of the clutch while the engine is running as long as the side support 10 is in the operative position.

Figure 3:
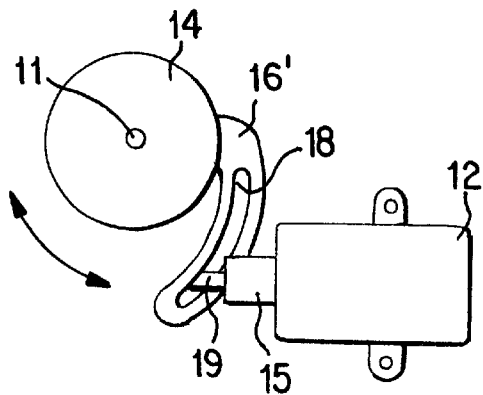
FIG. 3 is a schematic representation of a second embodiment of a drive-away blocking device, with only a hub of the side support being shown.

FIG. 3 shows a kinematic modification of the drive-away blocking device. In contrast to the embodiment illustrated in FIGS. 1 and 2, the linear switch 12 is rigidly fastened to the frame of the motorcycle. A control cam slot 18 is formed in the control component 16 which is fixedly connected with the hub 14 of the side support 10. On its free end, the actuating pin 15 of the linear switch 12 is connected with a pin 19 which engages into the control cam slot 18 of the control component 16'. As illustrated in FIG. 3, the control cam slot 18 has a variable distance from the axis of rotation 11 of the hub 14. When the side support 10 and thus the hub 14 is swivelled from the inoperative position illustrated in FIG. 3 clockwise into the operative position of the side support, the pin 19 slides in the control cam slot 18 of the control component 16'. The control cam slot 18 has a shape such that, similarly to the first embodiment, the actuating pin 15 necessarily carries out a linear movement with respect to the linear switch 12. Because of the eccentricity of the control cam slot 18, this linear movement of the actuating pin 15 may be significantly larger than the stroke required for the actual switching operation. This circumstance permits large tolerances. Because of the restricted guidance of the pin 19 in the control cam slot 18, the embodiment according to FIG. 3 is also characterized by high operational reliability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive-away blocking device for a motorcycle having a side support, the device comprising:

a sensor mounted on the motorcycle, said sensor having a linearly guided distance sensing device;

a control component rigidly connected with the side support, said control component being connected by way of a restricted guidance with the distance sensing device of the sensor at a location offset from a rotational axis of the side support; and wherein said sensor emits a signal to prevent the motorcycle from driving-away when the side support is in an operative position.

2. The drive-away blocking device according to claim 1, wherein said sensor is swivellably connected with the motorcycle; and wherein the distance measuring device is connected with the control component of the side support via a hinge.

3. The drive-away blocking device according to claim 1, wherein the sensor is rigidly fastened to the vehicle; and wherein the distance measuring device of the sensor is coupled via a control cam of the control component.

4. The drive-away blocking device according to claim 3, wherein the distance measuring device has a pin arranged at its free end, said pin being guided in a control cam slot of the control cam.

5. The drive-away blocking device according to claim 1, wherein said sensor is a linear switch arranged in an electric circuit for an engine of the motorcycle.

6. The drive-away blocking device according to claim 2, wherein said sensor is a linear switch arranged in an electric circuit for an engine of the motorcycle.

7. The drive-away blocking device according to claim 3, wherein said sensor is a linear switch arranged in an electric circuit for an engine of the motorcycle.

8. The drive-away blocking device according to claim 4, wherein said sensor is a linear switch arranged in an electric circuit for an engine of the motorcycle.

* * * * *